(12) United States Patent
Palmer et al.

(10) Patent No.: US 11,797,380 B2
(45) Date of Patent: Oct. 24, 2023

(54) HOST-CONFIGURABLE ERROR PROTECTION

(71) Applicant: Micron Technology, Inc., Boise, ID (US)

(72) Inventors: David Aaron Palmer, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/647,700

(22) Filed: Jan. 11, 2022

(65) Prior Publication Data

US 2023/0214294 A1 Jul. 6, 2023

Related U.S. Application Data

(60) Provisional application No. 63/266,219, filed on Dec. 30, 2021.

(51) Int. Cl.
*G06F 12/02* (2006.01)
*G06F 11/10* (2006.01)
*G06F 11/07* (2006.01)
*G06F 11/14* (2006.01)

(52) U.S. Cl.
CPC ...... *G06F 11/1068* (2013.01); *G06F 11/0772* (2013.01); *G06F 11/142* (2013.01); *G06F 11/1417* (2013.01); *G06F 12/0238* (2013.01)

(58) Field of Classification Search
CPC ............. G06F 11/1068; G06F 11/0772; G06F 11/1417; G06F 11/142; G06F 12/0238
USPC ........................................................ 714/764
See application file for complete search history.

(56) References Cited

U.S. PATENT DOCUMENTS

| | | | | |
|---|---|---|---|---|
| 8,572,311 | B1* | 10/2013 | Shalvi | G11C 29/52 |
| | | | | 711/103 |
| 2015/0019935 | A1* | 1/2015 | Gilda | G06F 11/0793 |
| | | | | 714/764 |
| 2016/0006459 | A1* | 1/2016 | Hanham | H03M 13/1111 |
| | | | | 714/764 |
| 2016/0139989 | A1* | 5/2016 | Muralimanohar | G06F 3/064 |
| | | | | 714/764 |
| 2016/0170832 | A1* | 6/2016 | Armstrong | G06F 11/1076 |
| | | | | 714/764 |
| 2016/0301428 | A1* | 10/2016 | Andrade Costa | H03M 13/353 |
| 2017/0177429 | A1* | 6/2017 | Stark | G06F 11/0751 |
| 2019/0146874 | A1* | 5/2019 | Gschwind | G11C 29/52 |
| | | | | 714/764 |

* cited by examiner

*Primary Examiner* — Albert Decady
*Assistant Examiner* — Enam Ahmed
(74) *Attorney, Agent, or Firm* — Holland & Hart LLP

(57) ABSTRACT

Methods, systems, and devices for host-configurable error protection are described. A host system may receive an indication of a set of logical addresses supported by the memory system and available for use by the host system. The host system may divide the set of logical addresses into subsets of logical addresses. Each subset of logical addresses may be associated with a different type of data. The host system may determine an error protection configuration for a subset of logical addresses based at least in part on the type of data associated with the subset of logical addresses. The host system may then send to the memory system an indication of the subset of logical addresses and an indication of the error protection configuration for the subset of logical addresses.

25 Claims, 8 Drawing Sheets

Memory Die 405 — Memory Plane 410

1:1 Error Protection Configuration

| Die 0 | | | | Die 1 | | | | Die 2 | | | | Die 3 | | | |
|---|---|---|---|---|---|---|---|---|---|---|---|---|---|---|---|
| P0 | P1 | P2 | P3 | P0 | P1 | P2 | P3 | P0 | P1 | P2 | P3 | P0 | P1 | P2 | P3 |
| 0 | 1 | 32 | 33 | 2 | 3 | 34 | 35 | 4 | 5 | 36 | 37 | 6 | 7 | 38 | 39 |
| 40 | 41 | 8 | 9 | 42 | 43 | 10 | 11 | 44 | 45 | 12 | 13 | 46 | 47 | 14 | 15 |
| 16 | 17 | 48 | 49 | 18 | 19 | 50 | 51 | 20 | 21 | 52 | 53 | 22 | 23 | 54 | 55 |
| 56 | 57 | 24 | 25 | 58 | 59 | 26 | 27 | 60 | 61 | 28 | 29 | 62 | 63 | 30 | 31 |

Memory Portion 415

3:1 Error Protection Configuration

| Die 0 | | | | Die 1 | | | | Die 2 | | | | Die 3 | | | |
|---|---|---|---|---|---|---|---|---|---|---|---|---|---|---|---|
| P0 | P1 | P2 | P3 | P0 | P1 | P2 | P3 | P0 | P1 | P2 | P3 | P0 | P1 | P2 | P3 |
| 1 | 2 | 3 | 48 | 36 | 4 | 5 | 49 | 6 | 7 | 8 | 50 | 9 | 10 | 11 | 51 |
| 12 | 13 | 52 | 14 | 15 | 16 | 53 | 17 | 18 | 19 | 54 | 20 | 21 | 22 | 55 | 23 |
| 24 | 56 | 25 | 26 | 27 | 57 | 28 | 29 | 30 | 58 | 31 | 32 | 33 | 59 | 34 | 35 |
| 60 | 36 | 37 | 38 | 61 | 39 | 40 | 41 | 62 | 42 | 43 | 44 | 63 | 45 | 46 | 47 |

7:1 Error Protection Configuration

| Die 0 | | | | Die 1 | | | | Die 2 | | | | Die 3 | | | |
|---|---|---|---|---|---|---|---|---|---|---|---|---|---|---|---|
| P0 | P1 | P2 | P3 | P0 | P1 | P2 | P3 | P0 | P1 | P2 | P3 | P0 | P1 | P2 | P3 |
| 0 | 1 | 2 | 56 | 3 | 4 | 5 | 57 | 6 | 7 | 8 | 9 | 10 | 11 | 12 | 13 |
| 14 | 15 | 16 | 17 | 18 | 19 | 20 | 21 | 22 | 23 | 24 | 58 | 25 | 26 | 27 | 59 |
| 28 | 29 | 60 | 30 | 31 | 32 | 61 | 33 | 34 | 35 | 36 | 37 | 38 | 39 | 40 | 41 |
| 42 | 43 | 44 | 45 | 46 | 47 | 48 | 49 | 50 | 51 | 62 | 52 | 53 | 54 | 63 | 55 |

15:1 Error Protection Configuration

| Die 0 | | | | Die 1 | | | | Die 2 | | | | Die 3 | | | |
|---|---|---|---|---|---|---|---|---|---|---|---|---|---|---|---|
| P0 | P1 | P2 | P3 | P0 | P1 | P2 | P3 | P0 | P1 | P2 | P3 | P0 | P1 | P2 | P3 |
| 0 | 1 | 2 | 60 | 3 | 4 | 5 | 6 | 7 | 8 | 9 | 10 | 12 | 12 | 13 | 14 |
| 15 | 16 | 17 | 18 | 19 | 20 | 21 | 61 | 22 | 23 | 24 | 25 | 26 | 27 | 28 | 29 |
| 30 | 31 | 32 | 33 | 34 | 35 | 36 | 37 | 38 | 39 | 40 | 62 | 41 | 42 | 43 | 44 |
| 45 | 46 | 47 | 48 | 49 | 50 | 51 | 52 | 53 | 54 | 55 | 56 | 56 | 58 | 59 | 63 |

31:1 Error Protection Configuration

| Die 0 | | | | Die 1 | | | | Die 2 | | | | Die 3 | | | |
|---|---|---|---|---|---|---|---|---|---|---|---|---|---|---|---|
| P0 | P1 | P2 | P3 | P0 | P1 | P2 | P3 | P0 | P1 | P2 | P3 | P0 | P1 | P2 | P3 |
| 0 | 1 | 2 | 3 | 4 | 5 | 6 | 7 | 8 | 9 | 10 | 11 | 12 | 13 | 14 | 15 |
| 16 | 17 | 18 | 19 | 20 | 21 | 22 | 62 | 23 | 24 | 25 | 26 | 27 | 28 | 29 | 30 |
| 31 | 32 | 33 | 34 | 35 | 36 | 37 | 38 | 39 | 40 | 41 | 42 | 43 | 44 | 45 | 46 |
| 47 | 48 | 49 | 50 | 51 | 52 | 53 | 54 | 55 | 56 | 57 | 58 | 59 | 60 | 61 | 63 |

HOST-CONFIGURABLE ERROR PROTECTION

CROSS REFERENCE

The present Application for Patent claims the benefit of U.S. Provisional Patent Application No. 63/266,219 by PALMER et al., entitled "HOST-CONFIGURABLE ERROR PROTECTION," filed Dec. 30, 2021, assigned to the assignee hereof, and expressly incorporated by reference in its entirety herein.

FIELD OF TECHNOLOGY

The following relates generally to one or more systems for memory and more specifically to host-configurable error protection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 4 illustrates an example of a memory that supports host-configurable error protection in accordance with examples as disclosed herein.

DETAILED DESCRIPTION

A memory system, such as a NAND memory system, may implement an error protection configuration to improve the reliability of the memory system. For example, a memory system may implement an error protection configuration, such as a redundant array of independent NAND (RAIN) configuration, to protect data (e.g., data received from a host device) that is stored in the one or more memory media of the memory system. However, the error protection configuration implemented by the memory system may be inefficient for some types of data. For example, the resources consumed by the error protection configuration may be excessive for some types of data and the latency associated with the error protection configuration may be excessive for other types of data, among other disadvantages that may negatively impact memory system performance.

According to the techniques described herein, a host system may improve memory system performance by instructing a memory system to use different error protection configurations for different subsets of logical addresses (which may be referred to as partitions) that are reserved for or associated with different types of data. For example, given a set of logical addresses available for use, the host system may divide the set of logical addresses into subsets of logical addresses that are each associated with a respective type of data. The host system may then determine an appropriate error protection configuration for each subset of logical addresses based on the type of data associated with that subset. After determining the error protection configurations for the subsets of logical addresses, the host system may inform (e.g., indicate to) the memory system of the subsets as well as the corresponding error protection configurations. Thus, the memory system may use different error protection configurations that are tailored to different types of data, which may improve memory system performance.

Figure 1:
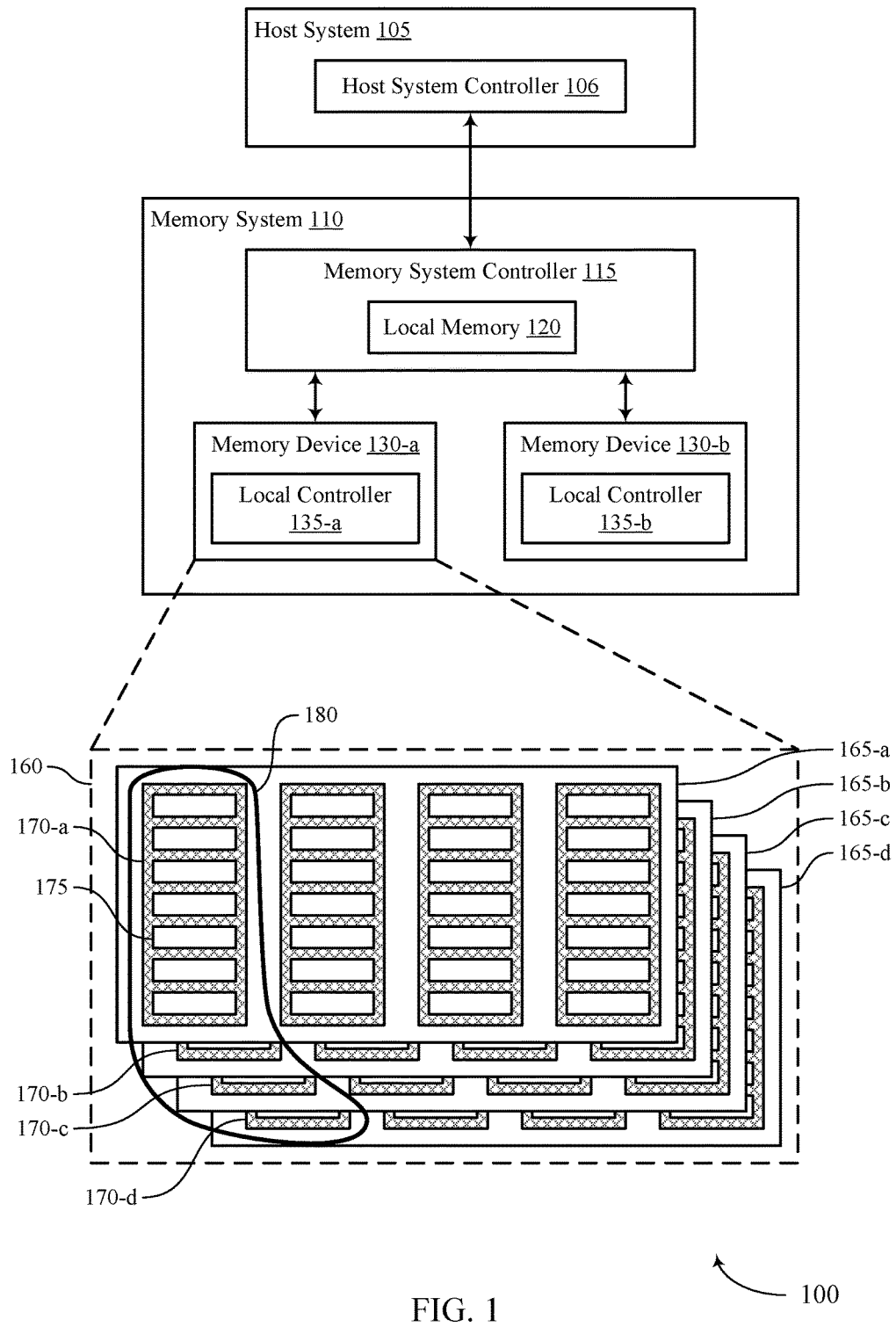
FIG. 1 illustrates an example of a system that supports host-configurable error protection in accordance with examples as disclosed herein.
Figure 2:
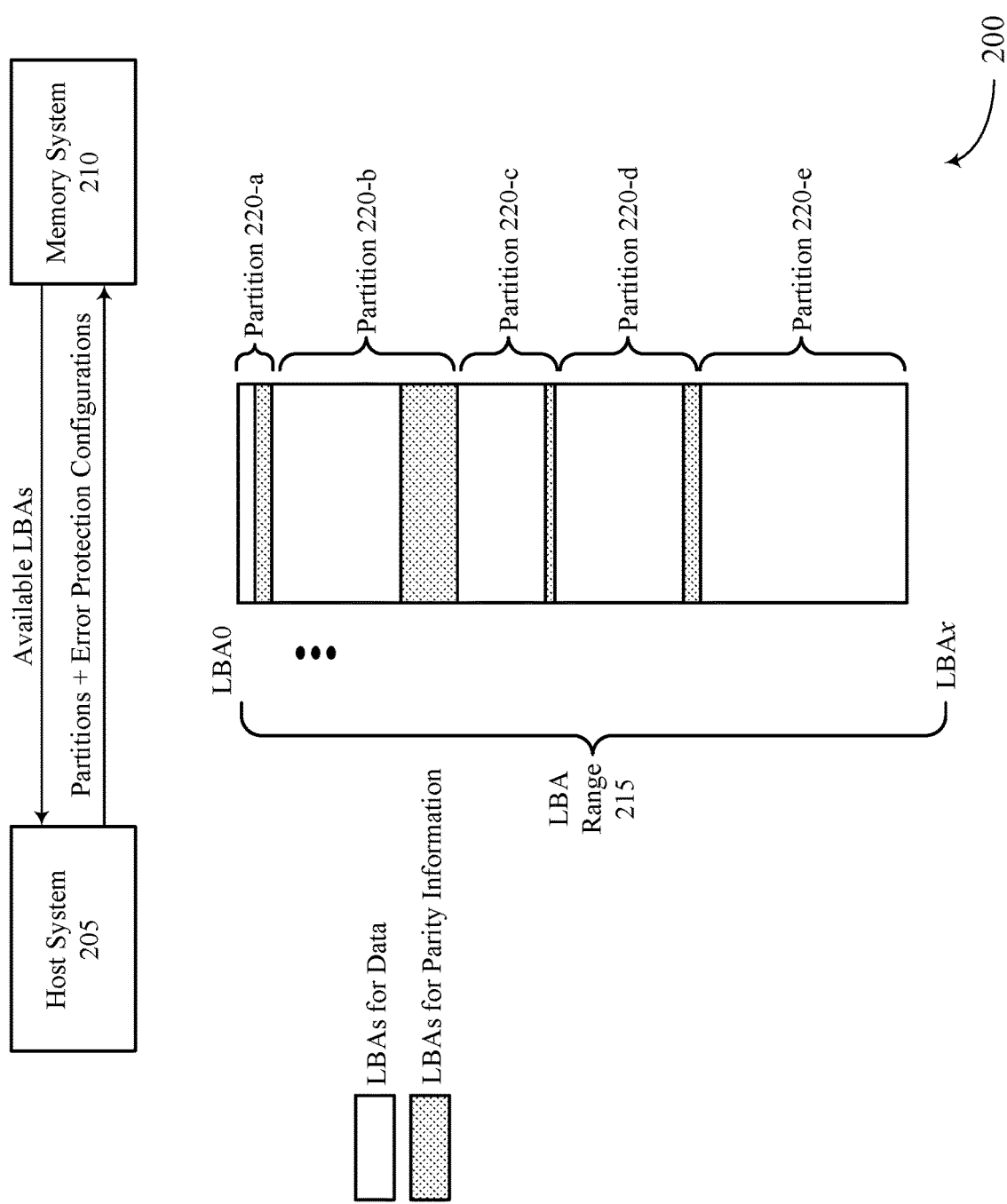
FIG. 2 illustrates an example of a system that supports host-configurable error protection in accordance with examples as disclosed herein.

Features of the disclosure are initially described in the context of systems, devices, and circuits with reference to FIGS. 1 through 2. Features of the disclosure are described in the context of a process flow and a memory with reference to FIGS. 3 and 4. These and other features of the disclosure are further illustrated by and described in the context of an apparatus diagram and flowchart that relate to host-configurable error protection with reference to FIGS. 5-8.

FIG. 1 illustrates an example of a system 100 that supports host-configurable error protection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more memory dies 160. A memory die 160 may, in some examples, be a piece of electronics-grade semiconductor cut from a wafer (e.g., a silicon die cut from a silicon wafer). Each memory die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support host-configurable error protection. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may implement an error protection configuration to improve the reliability of the memory system 110. The error protection configuration may define a ratio of data to parity information (where parity information refers to error protection information that is generated based on the data). For example, the memory system 110 may implement a RAIN configuration that allows the memory system 110 to recover lost or corrupted data. Different RAIN configurations may involve different ratios of data (d) to parity information (p), where the ratio of data to parity information is denoted d:p. For example, a 3:1 RAIN configuration may involve 1 unit of parity information per 3 units of data, where a unit is measured in quantity of bits or a quantity of logical addresses, among other examples. To generate the parity information for a set of data, the memory system 110 may perform a series of XOR computations on the data. The memory system 110 may then store the set of data and the related parity information in a memory device 130. To recover the set of data using parity information, the memory system 110 may perform another series of XOR computations not only on the set of data but on the parity information as well.

Different error protection configurations may consume different amounts of resources and be associated with different latencies. For example, as the ratio of data to parity information increases, the memory media consumed for parity information may decrease and the latency for error protection (e.g., the latency associated with generating parity information and recovering data) may increase. Conversely, as the ratio of data to parity information decreases, the memory media consumed for parity information may increase and the latency for error protection may decrease. To illustrate, a 3:1 RAIN configuration may consume more memory media, but have faster latency, relative to a 15:1 RAIN configuration. Thus, the latency associated with an error protection configuration may be inversely proportional to the memory media consumed by the error protection configuration.

In some examples, a memory system may indiscriminately implement the same error protection configuration for incoming data regardless of the type of the data (e.g., because the memory system may be unaware of the type of data received from the host system for storage). But using the same error protection configuration for all incoming data may be inefficient. For example, the error protection configuration may be appropriate for a first type of data but may be too slow for a second type of data, may consume excess memory for a third type of data, or both.

According to the techniques described herein, the host system 105 may help the memory system 110 use different error protection configurations for different types (e.g., classes, categories) of data. The host system 105 may determine different subsets of logical addresses for storing different types of data, then instruct the memory system 110 to use different error protection configurations for the different subsets of logical addresses.

FIG. 2 illustrates an example of a system 200 that supports host-configurable error protection in accordance with examples as disclosed herein. The system 200 may be an example of the system 100 and may include a host system 205 and a memory system 210. The host system 205 may be an example of the host system 105 as described with reference to FIG. 1 and the memory system 210 may be an example of the memory system 110 as described with reference to FIG. 1.

The memory system 210 may include one or more memory devices (e.g., one or more non-volatile memory devices) with a combined storage capacity that covers x LBAs. So, the range of LBAs supported by the memory system 210, and available for use by the host system 205, may be x+1 LBAs, represented by LBA range 215. The LBAs may also be referred to as logical addresses and may increment numerically by one. Thus, the LBA range 215 may be a set of consecutively indexed LBAs (e.g., LBA0, LBA1, LBA2 . . . LBAx). Each LBA may be associated with an amount of data (e.g., 4 kB) and the memory system 210 may map the LBAs to physical block addresses used by the memory system 210 to identify physical portions of memory.

The memory system 210 may inform the host system 205 of the set of LBAs available for use by the host system 205. For example, the memory system 210 may send an indication of the set of LBAs covered by the LBA range 215. The host system 205 may divide the set of LBAs into partitions, which may refer to subsets of LBAs. For example, each partition may include a respective subset of LBAs, such as consecutively indexed LBAs, from the LBA range 215. Each partition may be associated with (e.g., reserved for) a respective type of data. For example, partition 220-a may be associated with a first type of data (e.g., boot data for booting the system 200 or the host system 205); partition 220-b may be associated with a second type of data (e.g., operating system data for an operating system of the system 200 or the host system 205); partition 220-c may be associated with a third type of data (e.g., swap data); partition 220-d may be associated with a fourth type of data (e.g., user data); and partition 220-e may be associated with a fifth type of data (e.g., media data). Swap data may be data (e.g., application data) from a volatile memory (e.g., the local memory 120) that the memory system 110 temporarily stores in non-volatile memory to free up space in the volatile memory.

For a partition 220 the host system 205 may determine a respective error protection configuration that is based on (e.g., a function of) the type of data associated with that partition 220. The error protection configuration for a partition 220 may be determined based on (e.g., as a function of) the latency tolerance of the type of data associated with the partition 220, the priority level of the type of data, or both, among other metrics.

Thus, the host system 205 may determine a first error protection configuration (e.g., a 1:1 RAIN configuration) for partition 220-a based on (e.g., in response to) partition 220-a being associated with the first type of data (e.g., boot data). Similarly, the host system 205 may determine a second error protection configuration (e.g., a 15:1 RAIN configuration) for partition 220-b based on (e.g., in response to) partition 220-b being associated with the second type of data (e.g., operating system data). Similarly, the host system 205 may determine a third error protection configuration (e.g., a 127:1 RAIN configuration) for partition 220-c based on (e.g., in response to) partition 220-c being associated with the third type of data (e.g., swap data). Similarly, the host system 205 may determine a fourth error protection configuration (e.g., a 15:1 RAIN configuration) for partition 220-d based on (e.g., in response to) partition 220-d being associated with the fourth type of data (e.g., user data). And the host system 205 may determine a fifth error protection configuration (e.g., no RAIN configuration) for partition 220-e based on (e.g., in response to) partition 220-d being associated with the fifth type of data (e.g., media data).

After determining the partitions 220 and the error protection configurations, the host system 205 may indicate the partitions 220 and the error protection configurations to the memory system 210.

A partition 220 may, in some examples, include a sub-partition (e.g., a group of LBAs) that is reserved for (e.g., dedicated to) data and another sub-partition that is reserved for parity information. The sub-partitions may be determined by the host system 205 and indicated to the memory system 210 or the sub-partitions may be determined by the memory system 210 and indicated to the host system 205. The size of a sub-partition may be based on (e.g., a function of) the size of the partition 220 and the error protection configuration for the partition 220. For example, if partition 220-a covers 70,000 LBAs and the error protection configuration for partition 220-a is a 1:1 RAIN configuration, the sub-partition for data may cover 35,000 LBAs and the sub-partition for parity information may cover 35,000 LBAs. In a 1:1 RAIN configuration, the parity information for a set of data may be a replica (e.g., copy) of the set of data.

As another example, if partition 220-b covers 3,200,000 LBAs and the error protection configuration for partition 220-b is 15:1 RAIN, the sub-partition for data may cover 3,000,000 LBAs (e.g., 15/16 of partition 220-b) and the sub-partition for parity information may cover 200,000 LBAs (e.g., 1/16 of partition 220-b). As another example, if partition 220-c covers 524,288 LBAs and the error protection configuration for partition 220-c is a 127:1 RAIN configuration, the sub-partition for data may cover 520,192 LBAs (e.g., 127/128 of partition 220-c) and the sub-partition for parity information may cover 4096 LBAs (e.g., 1/128 of partition 220-c). As another example, if partition 220-d covers 3,145,728 LBAs and the error protection configuration for partition 220-c is a 15:1 RAIN configuration, the sub-partition for data may cover 2,949,120 LBAs (e.g., 15/16 of partition 220-d) and the sub-partition for parity information may cover 196,608 LBAs (e.g., 1/16 of partition 220-d). Because partition 220-e is configured without error protection, the entirety of partition 220-e may be reserved for data.

Thus, the host system 205 may configure different partitions 220 with different error protection configurations, which may allow the memory system 210 to apply different error protection configurations to different types of data. To illustrate, the following example is provided.

The host system 205 may identify data of a first data type for storage at the memory system 210. The host system 205 may then send the data to the memory system 210 for storage. The host system 205 may send the data with an indication of the LBAs that are associated with the data (e.g., the host system 205 may send that data along with one or more write commands that indicate the LBAs). The host system 205 may select the LBAs for the data so that the data is addressed to the partition that is associated with the first data type. Upon receipt of the data and the indication of the LBAs, the memory system 210 may determine the partition associated with the LBAs. The memory system 210 may then generate parity information (e.g., parity bits) for the data according to the error protection configuration associated with the partition.

After generating the parity information for the data, the memory system 210 may store the data and the parity information in a memory. For example, the memory system 210 may store the data in a physical portion of the memory that is mapped to the LBAs for the data and may store the parity information in a physical portion of the memory that is mapped to LBAs in the sub-partition reserved for parity information. If some of the data is lost or corrupted while in storage, the memory system 210 may read the data and the parity information from the memory and perform various operations (e.g., logic operations such as XOR operations) on the data and the parity information to recover the data. The operations performed on the data and the parity information may be in accordance with the error protection configuration for the partition from which the data and the parity information was read.

Thus, the memory system 210 may use a host-configured, data-type specific error protection configuration to protect and recover data stored in the memory system 210.

Figure 3:
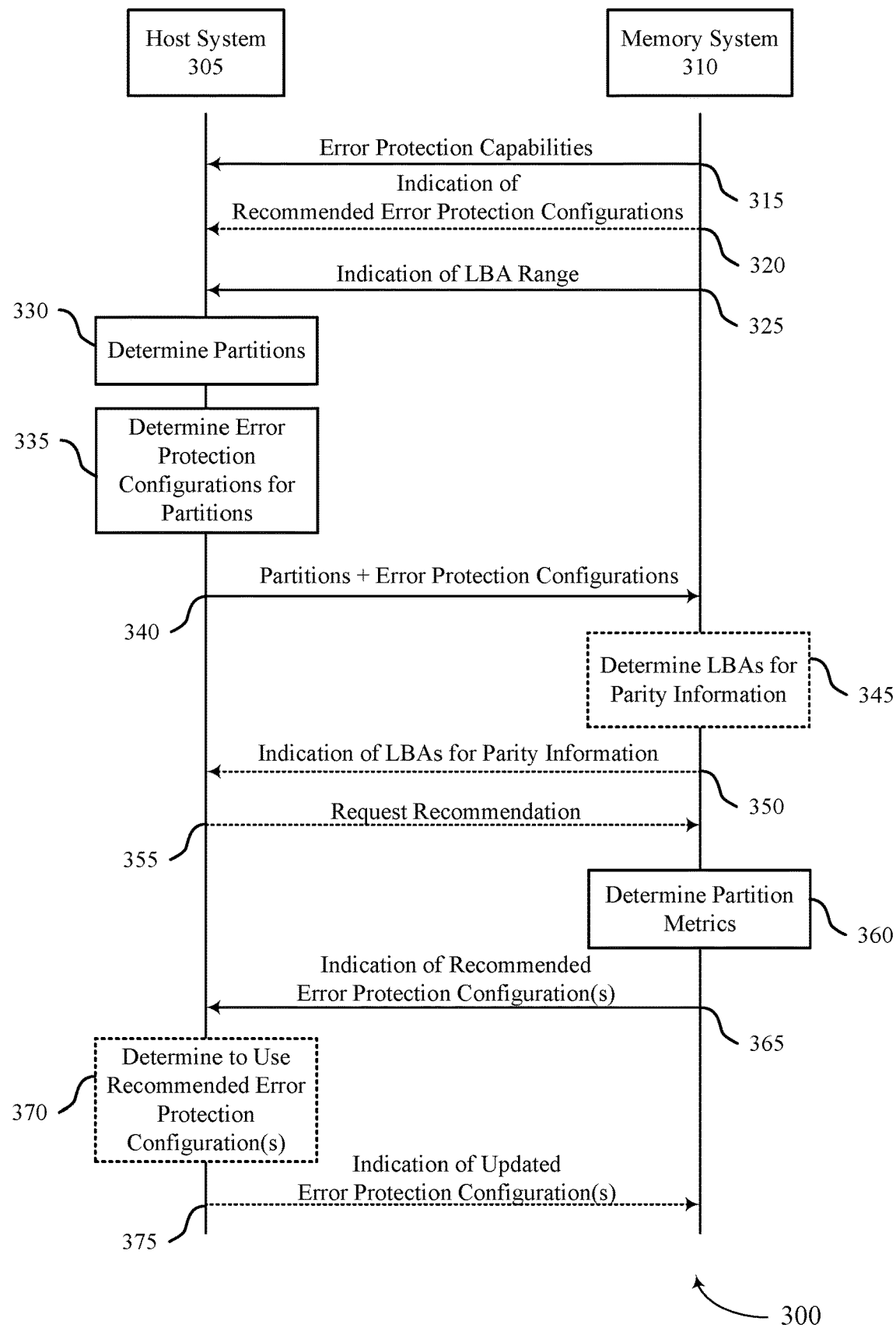
FIG. 3 illustrates an example of a process flow that supports host-configurable error protection in accordance with examples as disclosed herein.

FIG. 3 illustrates an example of a process flow 300 that supports host-configurable error protection in accordance with examples as disclosed herein. The process flow 300 may be implemented by a host system 305 and a memory system 310, which may be examples of a host system and a memory system described herein. Although various signals are shown being exchanged directly between the host system 305 and the memory system 310, it should be appreciated that signals may be relayed between the host system 305 and the memory system 310 by one or more intermediary devices. In general, a signal sent from system A to system B may refer to a signal that originates at system A and terminates at system B, regardless of any intermediate devices used to relay the signal.

Aspects of the process flow 300 may be implemented by a controller, among other components. Additionally or alternatively, aspects of the process flow 300 may be implemented as instructions stored in memory (e.g., firmware stored in a memory coupled with the host system 305 or the memory system 310). For example, the instructions, when executed by a controller (e.g., the host system controller 106, the memory system controller 115, a local controller 135), may cause the controller to perform the operations of the process flow 300.

At 315, the memory system 310 may send to the host system an indication of the error protection capabilities of the memory system 310. For example, the memory system 310 may indicate that the memory system 310 supports host-configurable error protection configurations. Put another way, the memory system 310 may indicate that the memory system 310 supports different error protection configurations for different partitions (e.g., subsets of logical addresses, such as LBAs). Additionally or alternatively, the memory system 310 may indicate the error protection configurations supported by the memory system 310. For example, the memory system 310 may indicate whether it supports various RAIN configurations such as 1:1 RAIN, 7:1 RAIN, 15:1 RAIN, 31:1 RAIN, 63:1 RAIN, 127:1 RAIN, 255:1 RAIN, and so on and so forth. The memory system 310 may send the indication of the error protection capabilities so that the host system 305 can account for the error protection capabilities of the memory system 310 if the host system 305 configures the memory system 310 with partition-specific protection configurations.

At 320, the memory system 310 may send to the host system 305 an indication of one or more recommended error protection configurations for different types of data. For example, the memory system 310 may recommend that a first error protection configuration be used for a first type of data, a second error protection configuration be used for a second type of data, and so on and so forth. The types of data may include boot data, operating system data, swap data, user data, media data, or any combination thereof, among other types of data.

At 325, the memory system 310 may send to the host system 305 an indication of a set of logical addresses (e.g., LBAs) supported by the memory system 310 and available for use by the host system 305. For example, the memory system 310 may indicate the LBA range of the memory system 310.

At 330, the host system 305 may determine partitions for the LBA range. For instance, the host system 305 may determine a first partition for a first type of data, a second partition for a second type of data, a third partition for a third type of data, and so on and so forth. The host system 305 may determine the partitions by dividing the set of logical addresses into subsets of logical addresses.

At 335, the host system 305 may determine error protection configurations for the partitions. For example, the host system 305 may determine an error protection configuration for a partition based on the type of data associated with that partition. So, the host system 305 may determine a first error protection configuration for a first partition, a second error protection configuration for a second partition, a third error protection configuration for a third partition, and so on and so forth.

At 340, the host system 305 may send to the memory system 310: 1) an indication of the partitions determined at 330, and 2) an indication of the error protection configurations determined at 335. The indications may indicate which error protection configuration is associated with each partition. In some examples, the memory system 310 may define one or more logical units (LUNs) that are mapped to the partitions indicated by the host system 305. Thus, the memory system 310 may use different error protection configuration for different LUNs.

At 345, the memory system 310 may determine groups of LBAs (e.g., sub-partitions) for parity information. For example, the memory system 310 may determine a sub-partition (within a partition) that is reserved for parity information. The memory system 310 may determine a sub-partition based on the size of the partition and the error protection configuration for the partition. At 350, the memory system 310 may send an indication of the sub-partitions (e.g., group of LBAs) to the host system 305. The memory system 310 may send an indication of the sub-partitions to the host system 305 so that the host system 305 can avoid addressing data to the LBAs reserved for parity information. As an alternative, the host system 305 may perform the operations at 345 and 350 (e.g., the host system 305 may determine the LBAs for parity information and may send an indication of the LBAs to the memory system 310).

At 355, the host system 305 may send to the memory system 310 a request for a recommended error protection configuration for one or more types of data. At 360, the memory system 310 may determine one or more metrics or conditions for one or more partitions. For example, the memory system 310 may determine a quantity of times within a threshold duration that the memory system used the parity information in a partition to recover data stored in the partition. The memory system 310 may determine the metrics or conditions based on (e.g., in response to) the request received at 355.

The memory system 310 may use the metric(s) or condition(s) for a partition as one or more bases for determining a recommended error protection configuration for the partition. For example, if the parity information for a partition has been used less than a threshold quantity of times within a threshold duration, the memory system 310 may recommend an error protection configuration that has a higher ratio of data to parity information relative to the current error protection configuration. Thus, the memory system 310 may decrease the memory media allocated to parity information for data that is infrequently recovered (e.g., reconstructed using the parity information). If the parity information for a partition has been used more than a threshold quantity of times within a threshold duration, the memory system 310 may recommend an error protection configuration that has a lower ratio of data to parity information relative to the current error protection configuration. Thus, the memory system 310 may decrease the error protection latency for data that is frequently recovered.

At 365, the memory system 310 may send to the host system 305 an indication of one or more recommended error protection configurations for one or more partitions. At 370, the host system 305 may determine to use one or more of the recommended error protection configuration for one or more of the partitions. Accordingly, at 310, the host system 305 may send an indication of one or more updated error protection configurations for one or more partitions. The updated error protection configuration(s) may correspond to the recommended error protection configurations.

Thus, the host system 305 may configure the memory system 310 so that the memory system 310 is able to use different error protection configurations for different partitions (and thus different types of data).

FIG. 4 illustrates an example of a memory 400 that supports host-configurable error protection in accordance with examples as disclosed herein. The memory 400 may include memory dies 405, denoted die 0, die 1, die 2, and die 3. Each memory die 405 may include a respective set of memory planes 410, denoted P0, P1, P2, and P3, and each memory plane 405 may include a set of memory portions 415. In some examples, the storage capacity of each memory portion 405 may be 1 mibibyte (MiB). The memory portions 405 may also be referred to as memory blocks. The memory 400 may be included in a memory system as described herein and may represent a partition as described herein. Although shown with a certain quantity of dies, planes, and memory portions, the techniques described herein may be implemented for a memory that includes any quantity of dies, planes, and memory portions.

For a given error protection configuration, the memory system (or a host system) may reserve a group of logical addresses to parity information. For example, if the memory 400 covers 64 logical addresses, the memory system (or the host system) may reserve a group of the 64 logical addresses to parity information. The quantity of logical addresses included in the group may be based on (e.g., a function of) the error protection configuration for the memory 400. For example, if the memory 400 is configured with a 1:1 error protection configuration (e.g., a 1:1 RAIN configuration), the memory system (or the host system) may select half of the 64 logical addresses for the group of logical addresses reserved for parity information. In some examples, the logical addresses selected for the group may be the logical addresses that are numerically last in the range of logical addresses covered by the memory 400. For instance, if the memory 400 is configured with a 1:1 error protection configuration, the logical addresses reserved for parity information may be logical addresses 32 through 63 (and the logical addresses reserved for data may be logical addresses 0 through 31).

As another example, if the memory 400 is configured with a 3:1 error protection configuration, the logical addresses reserved for parity information may be logical addresses 48 through 63 (and the logical addresses reserved for data may be logical addresses 0 through 47). As another example, if the memory 400 is configured with a 7:1 error protection configuration, the logical addresses reserved for parity information may be logical addresses 56 through 63 (and the logical addresses reserved for data may be logical addresses 0 through 55). As another example, if the memory 400 is configured with a 15:1 error protection configuration, the logical addresses reserved for parity information may be logical addresses 60 through 63 (and the logical addresses reserved for data may be logical addresses 0 through 59). As another example, if the memory 400 is configured with a 31:1 error protection configuration, the logical addresses reserved for parity information may be logical addresses 62 and 63 (and the logical addresses reserved for data may be logical addresses 0 through 61).

In FIG. 4, the memory portions 405 assigned logical addresses that are reserved for parity information are shown as shaded boxes. Example mappings for different error protection configurations are illustrated in FIG. 4; however, other mappings are contemplated and within the scope of the present disclosure.

For a given error protection configuration the memory system may strategically (e.g., based on the characteristics of the memory system) map the logical addresses reserved for parity information to memory portions 405. For example, the memory system may map the logical addresses for parity information to memory portions 405 (e.g., memory portions with static single level cells (SLCs)) that have higher endurance relative to other memory portions 405. Thus, the logical address assigned to a memory portion 405 may not necessarily match the physical address assigned to the memory portion. For example, although the physical addresses assigned to the memory portions may increment numerically from 0 starting with the top memory portion 405 in plane 0 of die 0 and moving left to right (and wrapping around to the next row), the logical addresses may follow a different pattern (as shown for each error protection configuration).

Thus, the memory system may map the logical addresses for parity information to memory portions 405 according to different patterns depending on the error protection configuration.

Figure 5:
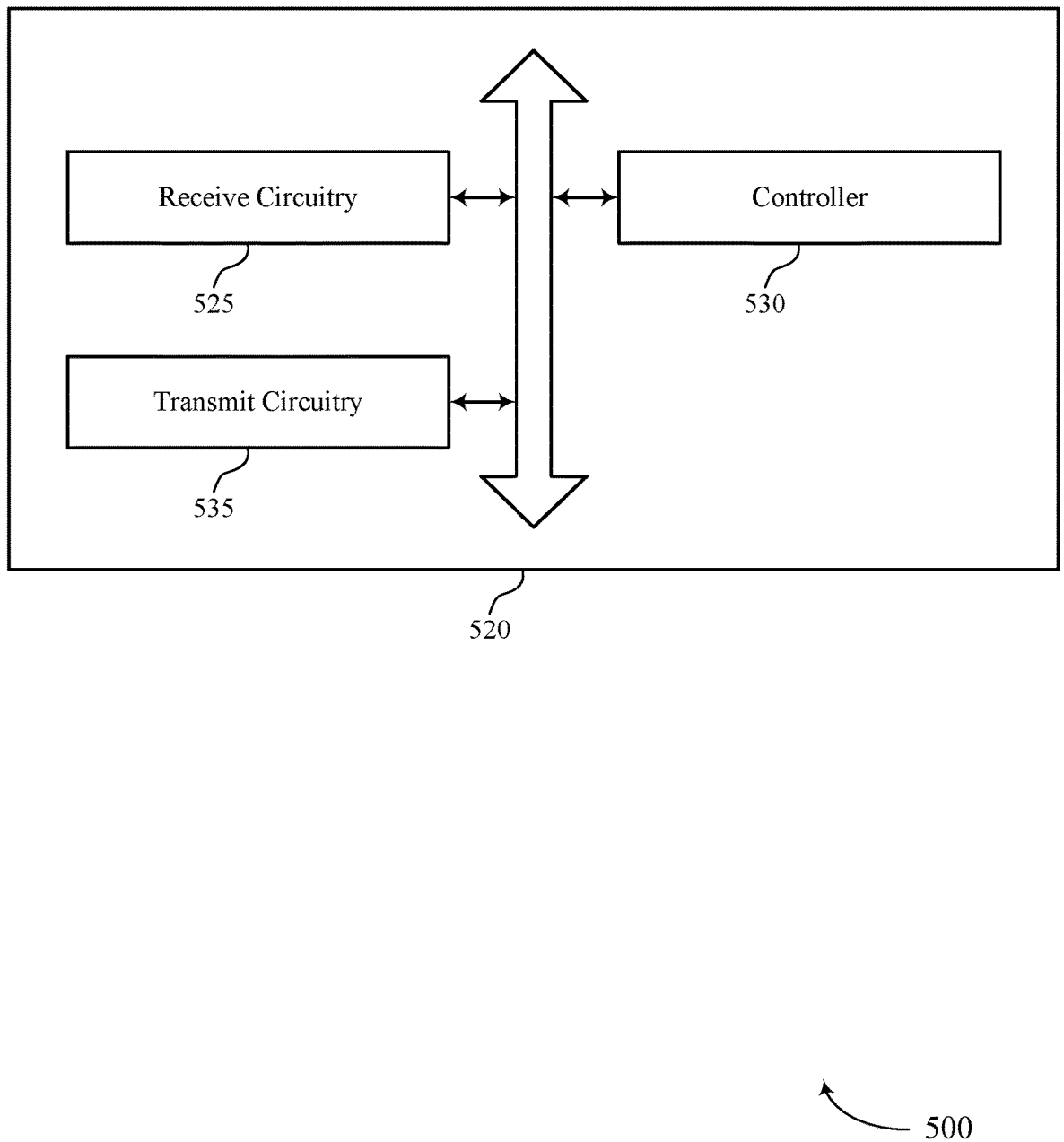
FIG. 5 shows a block diagram of a host system that supports host-configurable error protection in accordance with examples as disclosed herein.

FIG. 5 shows a block diagram 500 of a host system 520 that supports host-configurable error protection in accordance with examples as disclosed herein. The host system 520 may be an example of aspects of a host system as described with reference to FIGS. 1 through 4. The host system 520, or various components thereof, may be an example of means for performing various aspects of host-configurable error protection as described herein. For example, the host system 520 may include a receive circuitry 525, a controller 530, a transmit circuitry 535, or any combination thereof. Each of these components may communicate, directly or indirectly, with one another (e.g., via one or more buses).

The receive circuitry 525 may be configured as or otherwise support a means for receiving an indication of a set of logical addresses supported by a memory system and available for use by the host system. The controller 530 may be configured as or otherwise support a means for dividing the set of logical addresses into subsets of logical addresses each subset of which is associated with a different type of data, the subsets of logical addresses including a subset of logical addresses associated with a type of data from the different types of data. In some examples, the controller 530 may be configured as or otherwise support a means for determining an error protection configuration for the subset of logical addresses based at least in part on the type of data associated with the subset of logical addresses. The transmit circuitry 535 may be configured as or otherwise support a means for sending to the memory system an indication of the subset of logical addresses and an indication of the error protection configuration for the subset of logical addresses. The different types of data may include boot data, operating system data, swap data, user data, media data, or any combination thereof, among other types of data.

In some examples, the receive circuitry 525 may be configured as or otherwise support a means for receiving an indication of a plurality of error protection configurations supported by the memory system, where the error protection configuration for the subset of logical addresses is based at least in part on the plurality of error protection configurations supported by the memory system.

In some examples, the receive circuitry 525 may be configured as or otherwise support a means for receiving an indication that the memory system supports different error protection configurations for different subsets of logical addresses, where the error protection configuration for the subset of logical addresses is based at least in part on the memory system supporting different error protection configurations for different subsets of logical addresses.

In some examples, the receive circuitry 525 may be configured as or otherwise support a means for receiving an indication of a recommended error protection configuration for the type of data associated with the subset of logical addresses, where the error protection configuration for the subset of logical addresses is based at least in part on the indication of the recommended error protection configuration.

In some examples, the receive circuitry 525 may be configured as or otherwise support a means for receiving, after sending the indication of the subset of logical addresses and the indication of the error protection configuration, an indication of a recommended error protection configuration for the type of data associated with the subset of logical addresses. In some examples, the controller 530 may be configured as or otherwise support a means for determining a second error protection configuration for the subset of logical addresses based at least in part on the recommended error protection configuration. In some examples, the transmit circuitry 535 may be configured as or otherwise support a means for sending to the memory system an indication of the second error protection configuration for the subset.

In some examples, the transmit circuitry 535 may be configured as or otherwise support a means for sending a request for the recommended error protection configuration, where the indication of the recommended error protection configuration is received based at least in part on sending request.

In some examples, the receive circuitry 525 may be configured as or otherwise support a means for receiving, for the subset of logical addresses and based at least in part on sending the indication of the subset of logical addresses and the indication of the error protection configuration, an indication of a group of logical block addresses, of the subset of logical addresses, that is reserved for parity information.

In some examples, the controller 530 may be configured as or otherwise support a means for determining a group of logical block addresses, of the subset of logical addresses, to reserve for parity information. In some examples, the transmit circuitry 535 may be configured as or otherwise support a means for transmitting an indication of the group of logical block addresses to the memory system.

In some examples, the subsets of logical addresses include a second subset of logical addresses associated with a second type of data, and the controller 530 may be configured as or otherwise support a means for determining a second error protection configuration for the second subset of logical addresses based at least in part on the second type of data associated with the second subset of logical addresses. In some examples, the subsets of logical addresses include a second subset of logical addresses associated with a second type of data, and the transmit circuitry 535 may be configured as or otherwise support a means for sending to the memory system an indication of the second subset of logical addresses and an indication of the second error protection configuration for the second subset of logical addresses.

In some examples, the error protection configuration defines a ratio of data to parity information. In some examples, the different types of data include boot data for booting the apparatus, operating system data for running an operating system, user data, media data, or any combination thereof.

Figure 6:
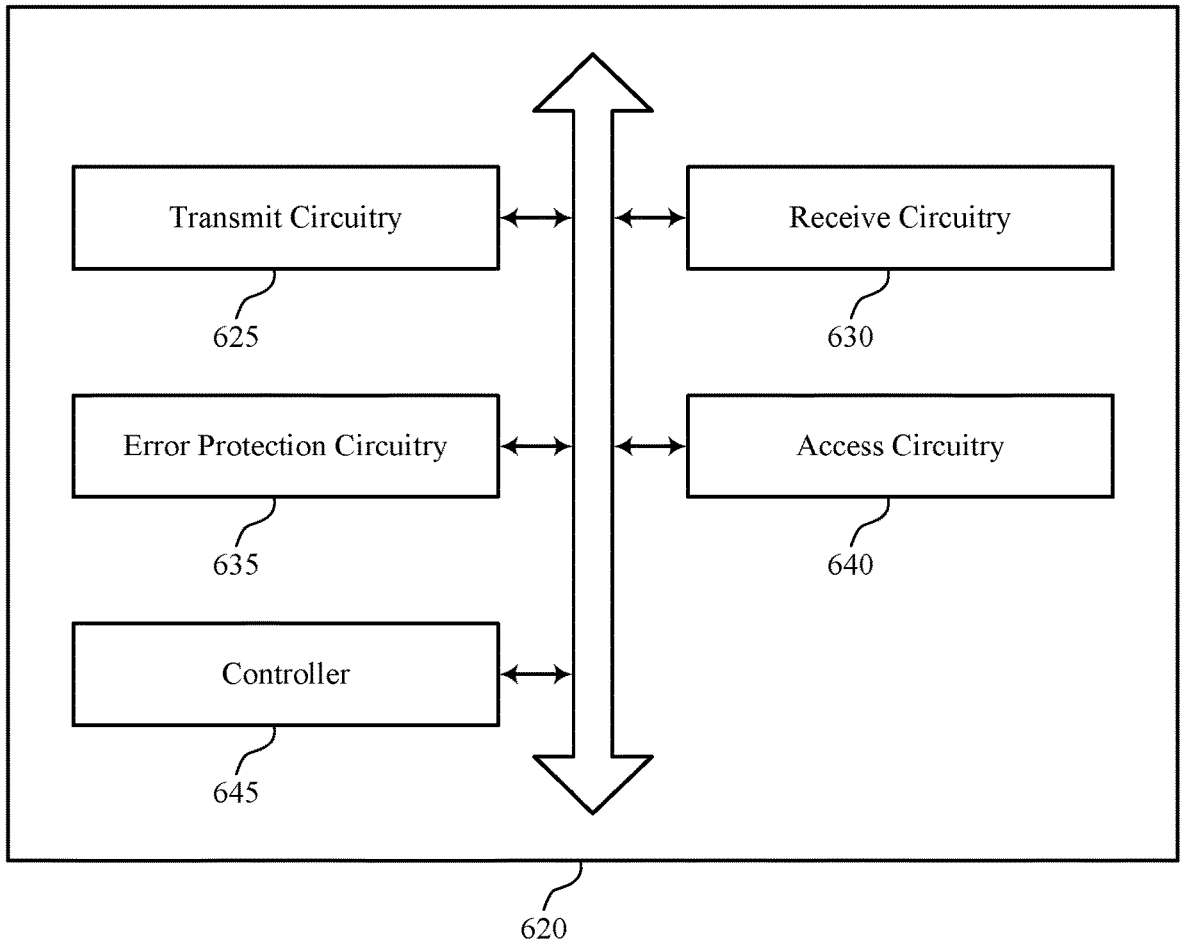
FIG. 6 shows a block diagram of a memory system that supports host-configurable error protection in accordance with examples as disclosed herein.

FIG. 6 shows a block diagram 600 of a memory system 620 that supports host-configurable error protection in accordance with examples as disclosed herein. The memory system 620 may be an example of aspects of a memory system as described with reference to FIGS. 1 through 4. The memory system 620, or various components thereof, may be an example of means for performing various aspects of host-configurable error protection as described herein. For example, the memory system 620 may include a transmit circuitry 625, a receive circuitry 630, an error protection circuitry 635, an access circuitry 640, a controller 645, or any combination thereof. Each of these components may communicate, directly or indirectly, with one another (e.g., via one or more buses).

The transmit circuitry 625 may be configured as or otherwise support a means for sending, to a host system, an indication of a set of logical addresses available for use by the host system. The receive circuitry 630 may be configured as or otherwise support a means for receiving, from the host system, an indication of a subset of logical addresses within the set of logical addresses and an indication of an error protection configuration for the subset. In some examples, the receive circuitry 630 may be configured as or otherwise support a means for receiving, from the host system, data associated with the subset of logical addresses. The error protection circuitry 635 may be configured as or otherwise support a means for generating parity information for the data based at least in part on the error protection configuration for the subset of logical addresses associated with the data.

In some examples, the access circuitry 640 may be configured as or otherwise support a means for storing the parity information for the data in a portion of a memory associated with a group of logical addresses reserved for parity information.

In some examples, the subset of logical addresses includes a quantity of logical addresses, and the controller 645 may be configured as or otherwise support a means for determining the group of logical addresses based at least in part on the quantity of logical addresses in the subset of logical addresses and the error protection configuration for the subset of logical addresses. In some examples, the subset of logical addresses includes a quantity of logical addresses, and the transmit circuitry 625 may be configured as or otherwise support a means for sending an indication of the group of logical addresses to the host system.

In some examples, the receive circuitry 630 may be configured as or otherwise support a means for receiving, from the host system, an indication of the group of logical addresses reserved for parity information, where the group of logical addresses is determined based at least in part on the indication of the group of logical addresses.

In some examples, the transmit circuitry 625 may be configured as or otherwise support a means for sending an indication of a plurality of error protection configurations supported by the memory system, where the indication of the subset of logical addresses and the indication of the error protection configuration are received based at least in part on sending the indication of the plurality of error protection configurations.

In some examples, the transmit circuitry 625 may be configured as or otherwise support a means for sending an indication that the memory system supports different error protection configurations for different subsets of logical addresses, where the indication of the subset of logical addresses and the indication of the error protection configuration are received based at least in part on sending the indication that the memory system supports different error protection configurations for different subsets of logical addresses.

In some examples, the transmit circuitry 625 may be configured as or otherwise support a means for sending an indication of a recommended error protection configuration for a type of data associated with the subset of logical addresses, where the indication of the subset of logical addresses and the indication of the error protection configuration are received based at least in part on sending the indication of the recommended error protection configuration.

In some examples, the transmit circuitry 625 may be configured as or otherwise support a means for sending, after receiving the indication of the subset of logical addresses and the indication of the error protection configuration, an indication of a recommended error protection configuration for a type of data associated with the subset of logical addresses. In some examples, the receive circuitry 630 may be configured as or otherwise support a means for receiving, based at least in part on sending the indication of the recommended error protection configuration, an indication of a second error protection configuration for the subset.

In some examples, the receive circuitry 630 may be configured as or otherwise support a means for receiving a request for the recommended error protection configuration, where the indication of the recommended error protection configuration is sent based at least in part on receiving the request.

In some examples, the controller 645 may be configured as or otherwise support a means for determining a quantity of times the parity information has been accessed since the parity information was stored in the subset of logical addresses, where the recommended error protection configuration is based at least in part on the quantity of times.

Figure 7:
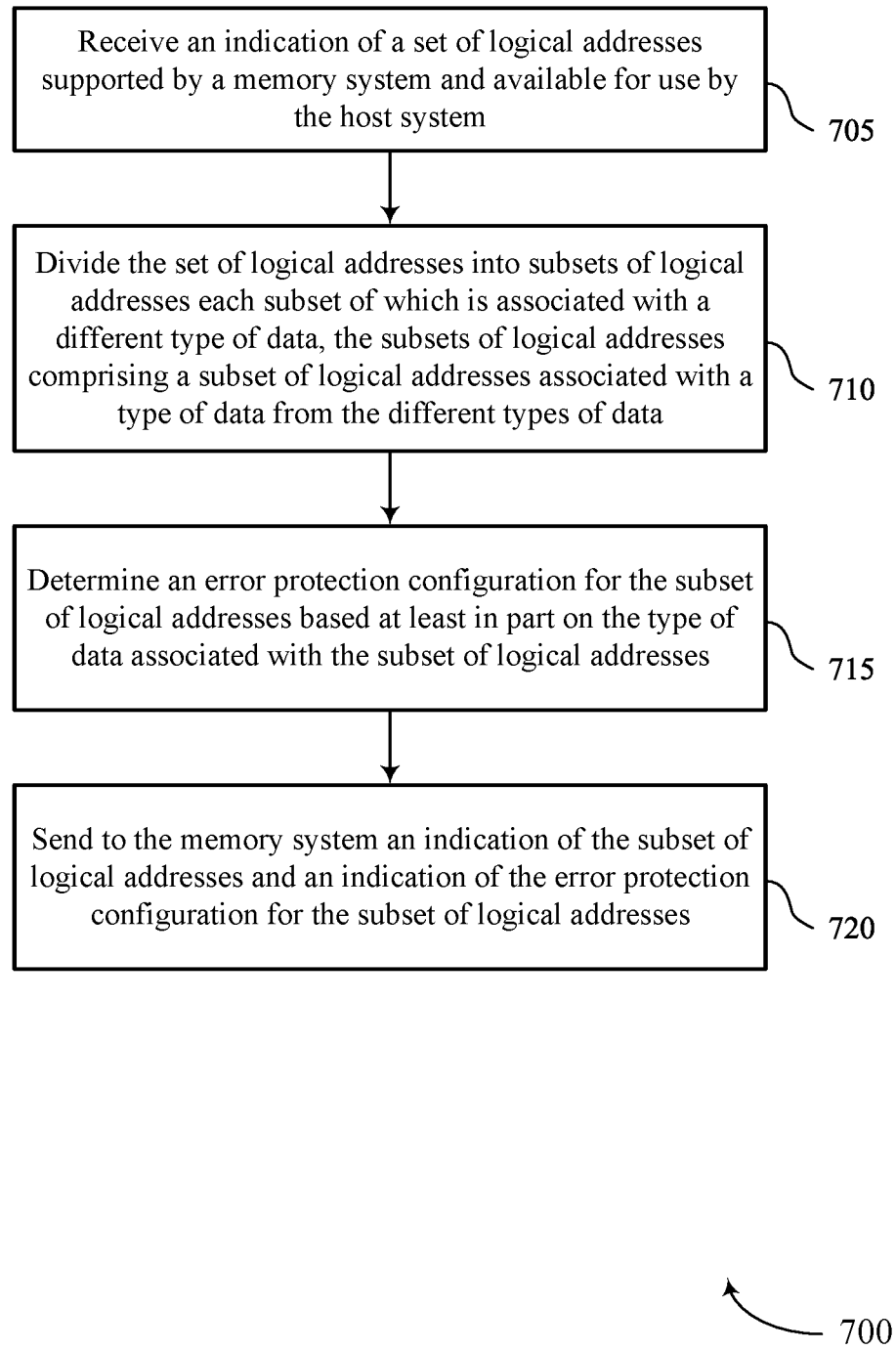
FIGS. 7 and 8 show flowcharts illustrating a method or methods that support host-configurable error protection in accordance with examples as disclosed herein.

FIG. 7 shows a flowchart illustrating a method 700 that supports host-configurable error protection in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 705, the method may include receiving an indication of a set of logical addresses supported by a memory system and available for use by the host system. The operations of 705 may be performed in accordance with examples as disclosed herein. In some examples, aspects of the operations of 705 may be performed by a receive circuitry 525 as described with reference to FIG. 5.

At 710, the method may include dividing the set of logical addresses into subsets of logical addresses each subset of which is associated with a different type of data, the subsets of logical addresses including a subset of logical addresses associated with a type of data from the different types of data. The operations of 710 may be performed in accordance with examples as disclosed herein. In some examples, aspects of the operations of 710 may be performed by a controller 530 as described with reference to FIG. 5.

At 715, the method may include determining an error protection configuration for the subset of logical addresses based at least in part on the type of data associated with the subset of logical addresses. The operations of 715 may be performed in accordance with examples as disclosed herein. In some examples, aspects of the operations of 715 may be performed by a controller 530 as described with reference to FIG. 5.

At 720, the method may include sending to the memory system an indication of the subset of logical addresses and an indication of the error protection configuration for the subset of logical addresses. The operations of 720 may be performed in accordance with examples as disclosed herein. In some examples, aspects of the operations of 720 may be performed by a transmit circuitry 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an indication of a set of logical addresses supported by a memory system and available for use by the host system; dividing the set of logical addresses into subsets of logical addresses each subset of which is associated with a different type of data, the subsets of logical addresses including a subset of logical addresses associated with a type of data from the different types of data; determining an error protection configuration for the subset of logical addresses based at least in part on the type of data associated with the subset of logical addresses; and sending to the memory system an indication of the subset of logical addresses and an indication of the error protection configuration for the subset of logical addresses.

Aspect 2: The method, apparatus, or non-transitory computer-readable medium of aspect 1, further including operations, features, circuitry, logic, means, or instructions, or any combination thereof for receiving an indication of a plurality of error protection configurations supported by the memory system, where the error protection configuration for the subset of logical addresses is based at least in part on the plurality of error protection configurations supported by the memory system.

Aspect 3: The method, apparatus, or non-transitory computer-readable medium of any of aspects 1 through 2, further including operations, features, circuitry, logic, means, or instructions, or any combination thereof for receiving an indication that the memory system supports different error protection configurations for different subsets of logical addresses, where the error protection configuration for the subset of logical addresses is based at least in part on the memory system supporting different error protection configurations for different subsets of logical addresses.

Aspect 4: The method, apparatus, or non-transitory computer-readable medium of any of aspects 1 through 3, further including operations, features, circuitry, logic, means, or instructions, or any combination thereof for receiving an indication of a recommended error protection configuration for the type of data associated with the subset of logical addresses, where the error protection configuration for the subset of logical addresses is based at least in part on the indication of the recommended error protection configuration.

Aspect 5: The method, apparatus, or non-transitory computer-readable medium of any of aspects 1 through 4, further including operations, features, circuitry, logic, means, or instructions, or any combination thereof for receiving, after sending the indication of the subset of logical addresses and the indication of the error protection configuration, an indication of a recommended error protection configuration for the type of data associated with the subset of logical addresses; determining a second error protection configuration for the subset of logical addresses based at least in part on the recommended error protection configuration; and sending to the memory system an indication of the second error protection configuration for the subset.

Aspect 6: The method, apparatus, or non-transitory computer-readable medium of aspect 5, further including operations, features, circuitry, logic, means, or instructions, or any combination thereof for sending a request for the recommended error protection configuration, where the indication of the recommended error protection configuration is received based at least in part on sending request.

Aspect 7: The method, apparatus, or non-transitory computer-readable medium of any of aspects 1 through 6, further including operations, features, circuitry, logic, means, or instructions, or any combination thereof for receiving, for the subset of logical addresses and based at least in part on sending the indication of the subset of logical addresses and the indication of the error protection configuration, an indication of a group of logical block addresses, of the subset of logical addresses, that is reserved for parity information.

Aspect 8: The method, apparatus, or non-transitory computer-readable medium of any of aspects 1 through 7, further including operations, features, circuitry, logic, means, or instructions, or any combination thereof for determining a group of logical block addresses, of the subset of logical addresses, to reserve for parity information and transmitting an indication of the group of logical block addresses to the memory system.

Aspect 9: The method, apparatus, or non-transitory computer-readable medium of any of aspects 1 through 8 where the subsets of logical addresses include a second subset of logical addresses associated with a second type of data and the method, apparatuses, and non-transitory computer-readable medium, further includes operations, features, circuitry, logic, means, or instructions, or any combination thereof for determining a second error protection configuration for the second subset of logical addresses based at least in part on the second type of data associated with the second subset of logical addresses and sending to the memory system an indication of the second subset of logical addresses and an indication of the second error protection configuration for the second subset of logical addresses.

Aspect 10: The method, apparatus, or non-transitory computer-readable medium of any of aspects 1 through 9, further including operations, features, circuitry, logic, means, or instructions, or any combination thereof for the error protection configuration defines a ratio of data to parity information.

Aspect 11: The method, apparatus, or non-transitory computer-readable medium of any of aspects 1 through 10, further including operations, features, circuitry, logic, means, or instructions, or any combination thereof for the different types of data include boot data for booting the apparatus, operating system data for running an operating system, user data, media data, or any combination thereof.

Figure 8:
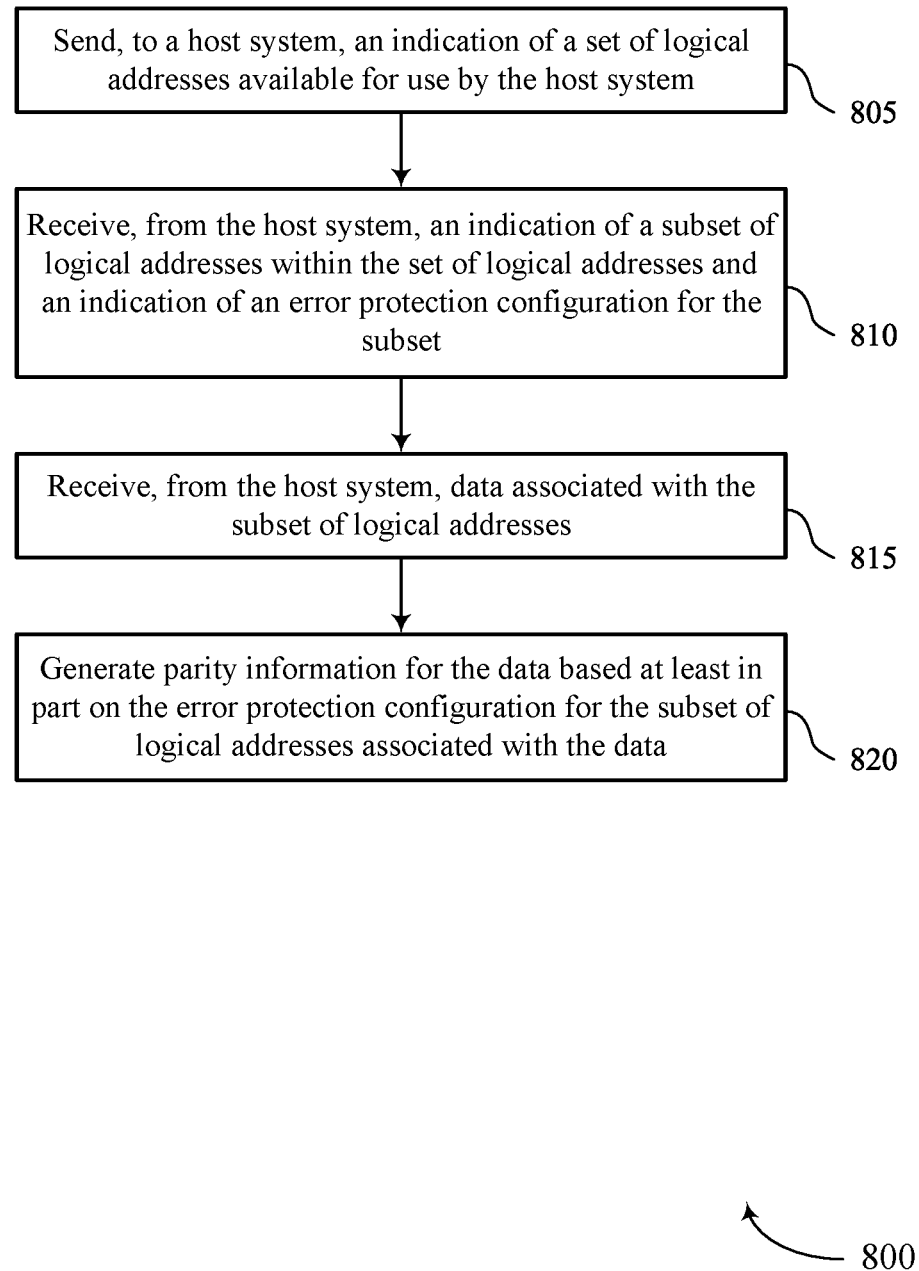

FIG. 8 shows a flowchart illustrating a method 800 that supports host-configurable error protection in accordance with examples as disclosed herein. The operations of method 800 may be implemented by a memory system or its components as described herein. For example, the operations of method 800 may be performed by a memory system as described with reference to FIGS. 1 through 4 and 6. In some examples, a memory system may execute a set of instructions to control the functional elements of the device to perform the described functions. Additionally or alternatively, the memory system may perform aspects of the described functions using special-purpose hardware.

At 805, the method may include sending, to a host system, an indication of a set of logical addresses available for use by the host system. The operations of 805 may be performed in accordance with examples as disclosed herein. In some examples, aspects of the operations of 805 may be performed by a transmit circuitry 625 as described with reference to FIG. 6.

At 810, the method may include receiving, from the host system, an indication of a subset of logical addresses within the set of logical addresses and an indication of an error protection configuration for the subset. The operations of 810 may be performed in accordance with examples as disclosed herein. In some examples, aspects of the operations of 810 may be performed by a receive circuitry 630 as described with reference to FIG. 6.

At 815, the method may include receiving, from the host system, data associated with the subset of logical addresses. The operations of 815 may be performed in accordance with examples as disclosed herein. In some examples, aspects of the operations of 815 may be performed by a receive circuitry 630 as described with reference to FIG. 6.

At 820, the method may include generating parity information for the data based at least in part on the error protection configuration for the subset of logical addresses associated with the data. The operations of 820 may be performed in accordance with examples as disclosed herein. In some examples, aspects of the operations of 820 may be performed by an error protection circuitry 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for sending, to a host system, an indication of a set of logical addresses available for use by the host system; receiving, from the host system, an indication of a subset of logical addresses within the set of logical addresses and an indication of an error protection configuration for the subset; receiving, from the host system, data associated with the subset of logical addresses; and generating parity information for the data based at least in part on the error protection configuration for the subset of logical addresses associated with the data.

Aspect 13: The method, apparatus, or non-transitory computer-readable medium of aspect 12, further including operations, features, circuitry, logic, means, or instructions, or any combination thereof for storing the parity information for the data in a portion of a memory associated with a group of logical addresses reserved for parity information.

Aspect 14: The method, apparatus, or non-transitory computer-readable medium of aspect 13 where the subset of logical addresses includes a quantity of logical addresses and the method, apparatuses, and non-transitory computer-readable medium, further includes operations, features, circuitry, logic, means, or instructions, or any combination thereof for determining the group of logical addresses based at least in part on the quantity of logical addresses in the subset of logical addresses and the error protection configuration for the subset of logical addresses and sending an indication of the group of logical addresses to the host system.

Aspect 15: The method, apparatus, or non-transitory computer-readable medium of any of aspects 13 through 14, further including operations, features, circuitry, logic, means, or instructions, or any combination thereof for receiving, from the host system, an indication of the group of logical addresses reserved for parity information, where the group of logical addresses is determined based at least in part on the indication of the group of logical addresses.

Aspect 16: The method, apparatus, or non-transitory computer-readable medium of any of aspects 12 through 15, further including operations, features, circuitry, logic, means, or instructions, or any combination thereof for sending an indication of a plurality of error protection configurations supported by the memory system, where the indication of the subset of logical addresses and the indication of the error protection configuration are received based at least in part on sending the indication of the plurality of error protection configurations.

Aspect 17: The method, apparatus, or non-transitory computer-readable medium of any of aspects 12 through 16, further including operations, features, circuitry, logic, means, or instructions, or any combination thereof for sending an indication that the memory system supports different error protection configurations for different subsets of logical addresses, where the indication of the subset of logical addresses and the indication of the error protection configuration are received based at least in part on sending the indication that the memory system supports different error protection configurations for different subsets of logical addresses.

Aspect 18: The method, apparatus, or non-transitory computer-readable medium of any of aspects 12 through 17, further including operations, features, circuitry, logic, means, or instructions, or any combination thereof for sending an indication of a recommended error protection configuration for a type of data associated with the subset of logical addresses, where the indication of the subset of logical addresses and the indication of the error protection configuration are received based at least in part on sending the indication of the recommended error protection configuration.

Aspect 19: The method, apparatus, or non-transitory computer-readable medium of any of aspects 12 through 18, further including operations, features, circuitry, logic, means, or instructions, or any combination thereof for sending, after receiving the indication of the subset of logical addresses and the indication of the error protection configuration, an indication of a recommended error protection configuration for a type of data associated with the subset of logical addresses and receiving, based at least in part on sending the indication of the recommended error protection configuration, an indication of a second error protection configuration for the subset.

Aspect 20: The method, apparatus, or non-transitory computer-readable medium of aspect 19, further including operations, features, circuitry, logic, means, or instructions, or any combination thereof for receiving a request for the recommended error protection configuration, where the indication of the recommended error protection configuration is sent based at least in part on receiving the request.

Aspect 21: The method, apparatus, or non-transitory computer-readable medium of any of aspects 19 through 20, further including operations, features, circuitry, logic, means, or instructions, or any combination thereof for determining a quantity of times the parity information has been accessed since the parity information was stored in the subset of logical addresses, where the recommended error protection configuration is based at least in part on the quantity of times.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: An apparatus, including: a controller configured to couple with a memory system and configured to cause the apparatus to: receive an indication of a set of logical addresses supported by the memory system and available for use by the apparatus; divide the set of logical addresses into subsets of logical addresses each subset of which is associated with a different type of data, the subsets of logical addresses including a subset of logical addresses associated with a type of data from the different types of data; determine an error protection configuration for the subset of logical addresses based at least in part on the type of data associated with the subset of logical addresses; and send to the memory system an indication of the subset of logical addresses and the error protection configuration for the subset of logical addresses.

Aspect 23: The apparatus of aspect 22, where the controller is further configured to cause the apparatus to: receive an indication of a plurality of error protection configurations supported by the memory system, where the error protection configuration for the subset of logical addresses is based at least in part on the plurality of error protection configurations supported by the memory system.

Aspect 24: The apparatus of any of aspects 22 through 23, where the controller is further configured to cause the apparatus to: receive an indication that the memory system supports different error protection configurations for different subsets of logical addresses, where the error protection configuration for the subset of logical addresses is based at least in part on the memory system supporting different error protection configurations for different subsets of logical addresses.

Aspect 25: The apparatus of any of aspects 22 through 24, where the controller is further configured to cause the apparatus to: receive an indication of a recommended error protection configuration for the type of data associated with the subset of logical addresses, where the error protection configuration for the subset of logical addresses is based at least in part on the indication of the recommended error protection configuration.

Aspect 26: The apparatus of any of aspects 22 through 25, where the controller is further configured to cause the apparatus to: receive, after sending the indication of the subset of logical addresses and the indication of the error protection configuration, an indication of a recommended error protection configuration for the type of data associated with the subset of logical addresses; determine a second error protection configuration for the subset of logical addresses based at least in part on the recommended error protection configuration; and send to the memory system an indication of the second error protection configuration for the subset.

Aspect 27: The apparatus of aspect 26, where the controller is further configured to cause the apparatus to: send a request for the recommended error protection configuration, where the indication of the recommended error protection configuration is received based at least in part on sending request.

Aspect 28: The apparatus of any of aspects 22 through 27, where the controller is further configured to cause the apparatus to: receive, for the subset of logical addresses and based at least in part on sending the indication of the subset of logical addresses and the indication of the error protection configuration, an indication of a group of logical block addresses, of the subset of logical addresses, that is reserved for parity information.

Aspect 29: The apparatus of any of aspects 22 through 28, where the controller is further configured to cause the apparatus to: determine a group of logical block addresses, of the subset of logical addresses, to reserve for parity information; and transmit an indication of the group of logical block addresses to the memory system.

Aspect 30: The apparatus of any of aspects 22 through 29, where the subsets of logical addresses include a second subset of logical addresses associated with a second type of data, and where the controller is further configured to cause the apparatus to: determine a second error protection configuration for the second subset of logical addresses based at least in part on the second type of data associated with the second subset of logical addresses; and send to the memory system an indication of the second subset of logical addresses and an indication of the second error protection configuration for the second subset of logical addresses.

Aspect 31: The apparatus of any of aspects 22 through 30, where the error protection configuration defines a ratio of data to parity information.

Aspect 32: The apparatus of any of aspects 22 through 31, where the different types of data include boot data for booting the apparatus, operating system data for running an operating system, user data, media data, or any combination thereof.

An apparatus is described. The following provides an overview of aspects of the apparatus as described herein:

Aspect 33: An apparatus, including: a memory system; and a controller coupled with the memory system and configured to cause the apparatus to: send, to a host system, an indication of a set of logical addresses available for use by the host system; receive, from the host system, an indication of a subset of logical addresses within the set of logical addresses and an indication of an error protection configuration for the subset; receive, from the host system, data associated with the subset of logical addresses; and generate parity information for the data based at least in part on the error protection configuration for the subset of logical addresses associated with the data.

Aspect 34: The apparatus of aspect 33, where the controller is further configured to cause the apparatus to: store the parity information for the data in a portion of a memory associated with a group of logical addresses reserved for parity information.

Aspect 35: The apparatus of aspect 34, where the subset of logical addresses includes a quantity of logical addresses, and where the controller is further configured to cause the apparatus to: determine the group of logical addresses based at least in part on the quantity of logical addresses in the subset of logical addresses and the error protection configuration for the subset of logical addresses; and send an indication of the group of logical addresses to the host system.

Aspect 36: The apparatus of any of aspects 34 through 35, where the controller is further configured to cause the apparatus to: receive, from the host system, an indication of the group of logical addresses reserved for parity information, where the group of logical addresses is determined based at least in part on the indication of the group of logical addresses.

Aspect 37: The apparatus of any of aspects 33 through 36, where the controller is further configured to cause the apparatus to: send an indication of a plurality of error protection configurations supported by the memory system, where the indication of the subset of logical addresses and the indication of the error protection configuration are received based at least in part on sending the indication of the plurality of error protection configurations.

Aspect 38: The apparatus of any of aspects 33 through 37, where the controller is further configured to cause the apparatus to: send an indication that the memory system supports different error protection configurations for different subsets of logical addresses, where the indication of the subset of logical addresses and the indication of the error protection configuration are received based at least in part on sending the indication that the memory system supports different error protection configurations for different subsets of logical addresses.

Aspect 39: The apparatus of any of aspects 33 through 38, where the controller is further configured to cause the apparatus to: send an indication of a recommended error protection configuration for a type of data associated with the subset of logical addresses, where the indication of the subset of logical addresses and the indication of the error protection configuration are received based at least in part on sending the indication of the recommended error protection configuration.

Aspect 40: The apparatus of any of aspects 33 through 39, where the controller is further configured to cause the apparatus to: send, after receiving the indication of the subset of logical addresses and the indication of the error protection configuration, an indication of a recommended error protection configuration for a type of data associated with the subset of logical addresses; and receive, based at least in part on sending the indication of the recommended error protection configuration, an indication of a second error protection configuration for the subset.

Aspect 41: The apparatus of aspect 40, where the controller is further configured to cause the apparatus to: receive a request for the recommended error protection configuration, where the indication of the recommended error protection configuration is sent based at least in part on receiving the request.

Aspect 42: The apparatus of any of aspects 40 through 41, where the controller is further configured to cause the apparatus to: determine a quantity of times the parity information has been accessed since the parity information was stored in the subset of logical addresses, where the recommended error protection configuration is based at least in part on the quantity of times.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET.

The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as any combination of computing devices (e.g., any combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a controller configured to couple with a memory system and configured to cause the apparatus to:
        receive an indication of a set of logical addresses supported by the memory system and available for use by the apparatus;
        assign different types of data to subsets of logical addresses of the set of logical addresses, the subsets of logical addresses comprising a subset of logical addresses assigned a type of data from the different types of data;
        select, for each subset of logical addresses, a respective error protection configuration for the subset of logical addresses, from a plurality of error protection configurations supported by the memory system, based at least in part on the type of data assigned to that subset of logical addresses; and
        send to the memory system an indication of the subset of logical addresses and an error protection configuration for the subset of logical addresses.

2. The apparatus of claim 1, wherein the controller is further configured to cause the apparatus to:

receive an indication of the plurality of error protection configurations supported by the memory system, wherein the error protection configuration for the subset of logical addresses is based at least in part on the plurality of error protection configurations supported by the memory system.

3. The apparatus of claim 1, wherein the controller is further configured to cause the apparatus to:

receive an indication that the memory system supports different error protection configurations for different subsets of logical addresses, wherein the error protection configuration for the subset of logical addresses is based at least in part on the memory system supporting different error protection configurations for different subsets of logical addresses.

4. The apparatus of claim 1, wherein the controller is further configured to cause the apparatus to:

receive an indication of a recommended error protection configuration for the type of data associated with the subset of logical addresses, wherein the error protection configuration for the subset of logical addresses is selected based at least in part on the indication of the recommended error protection configuration.

5. The apparatus of claim 1, wherein the controller is further configured to cause the apparatus to:

receive, after sending the indication of the subset of logical addresses and the indication of the error protection configuration, an indication of a recommended error protection configuration for the type of data assigned to the subset of logical addresses;

determine a second error protection configuration for the subset of logical addresses based at least in part on the recommended error protection configuration; and send to the memory system an indication of the second error protection configuration for the subset.

6. The apparatus of claim 5, wherein the controller is further configured to cause the apparatus to:

send a request for the recommended error protection configuration, wherein the indication of the recommended error protection configuration is received based at least in part on sending request.

7. The apparatus of claim 1, wherein the controller is further configured to cause the apparatus to:

receive, for the subset of logical addresses and based at least in part on sending the indication of the subset of logical addresses and the indication of the error protection configuration, an indication of a group of logical block addresses, of the subset of logical addresses, that is reserved for parity information.

8. The apparatus of claim 1, wherein the controller is further configured to cause the apparatus to:

determine a group of logical block addresses, of the subset of logical addresses, to reserve for parity information; and transmit an indication of the group of logical block addresses to the memory system.

9. The apparatus of claim 1, wherein the subsets of logical addresses comprise a second subset of logical addresses associated with a second type of data, and wherein the controller is further configured to cause the apparatus to:

determine a second error protection configuration for the second subset of logical addresses based at least in part on the second type of data associated with the second subset of logical addresses; and send to the memory system an indication of the second subset of logical addresses and an indication of the second error protection configuration for the second subset of logical addresses.

10. The apparatus of claim 1, wherein the error protection configuration defines a ratio of data to parity information.

11. The apparatus of claim 1, wherein the different types of data comprise boot data for booting the apparatus, operating system data for running an operating system, user data, media data, or any combination thereof.

12. An apparatus, comprising:

a memory system; and a controller coupled with the memory system and configured to cause the apparatus to:

send, to a host system, an indication of a set of logical addresses available for use by the host system;

receive, from the host system, an indication of a subset of logical addresses within the set of logical addresses and an indication of an error protection configuration for the memory system to use for the subset, wherein the error protection configuration for the subset is different than a second error protection configuration indicated for a second subset of logical addresses, within the set of logical addresses, that is assigned a different type of data than the subset of logical addresses;

receive, from the host system, data associated with the subset of logical addresses; and generate parity information for the data based at least in part on the error protection configuration for the subset of logical addresses associated with the data.

13. The apparatus of claim 12, wherein the controller is further configured to cause the apparatus to:

store the parity information for the data in a portion of a memory associated with a group of logical addresses reserved for parity information.

14. The apparatus of claim 13, wherein the subset of logical addresses comprises a quantity of logical addresses, and wherein the controller is further configured to cause the apparatus to:

determine the group of logical addresses based at least in part on the quantity of logical addresses in the subset of logical addresses and the error protection configuration for the subset of logical addresses; and send an indication of the group of logical addresses to the host system.

15. The apparatus of claim 13, wherein the controller is further configured to cause the apparatus to:

receive, from the host system, an indication of the group of logical addresses reserved for parity information, wherein the group of logical addresses is determined based at least in part on the indication of the group of logical addresses.

16. The apparatus of claim 12, wherein the controller is further configured to cause the apparatus to:

send an indication of a plurality of error protection configurations supported by the memory system, wherein the indication of the subset of logical addresses and the indication of the error protection configuration are received based at least in part on sending the indication of the plurality of error protection configurations.

17. The apparatus of claim 12, wherein the controller is further configured to cause the apparatus to:

send an indication that the memory system supports different error protection configurations for different subsets of logical addresses, wherein the indication of the subset of logical addresses and the indication of the error protection configuration are received based at least in part on sending the indication that the memory system supports different error protection configurations for different subsets of logical addresses.

18. The apparatus of claim 12, wherein the controller is further configured to cause the apparatus to:
send an indication of a recommended error protection configuration for a type of data associated with the subset of logical addresses, wherein the indication of the subset of logical addresses and the indication of the error protection configuration are received based at least in part on sending the indication of the recommended error protection configuration.

19. The apparatus of claim 12, wherein the controller is further configured to cause the apparatus to:
send, after receiving the indication of the subset of logical addresses and the indication of the error protection configuration, an indication of a recommended error protection configuration for a type of data associated with the subset of logical addresses; and
receive, based at least in part on sending the indication of the recommended error protection configuration, an indication of a second error protection configuration for the subset.

20. The apparatus of claim 19, wherein the controller is further configured to cause the apparatus to:
receive a request for the recommended error protection configuration, wherein the indication of the recommended error protection configuration is sent based at least in part on receiving the request.

21. An apparatus comprising:
a memory system; and
a controller coupled with the memory system and configured to cause the apparatus to:
send, to a host system, an indication of a set of logical addresses available for use by the host system;
receive, from the host system, an indication of a subset of logical addresses within the set of logical addresses and an indication of an error protection configuration for the subset;
receive, from the host system, data associated with the subset of logical addresses;
generate parity information for the data based at least in part on the error protection configuration for the subset of logical addresses associated with the data;
determine a quantity of times the parity information has been accessed since the parity information was stored in the subset of logical addresses;
send, after receiving the indication of the subset of logical addresses and the indication of the error protection configuration, an indication of a recommended error protection configuration for a type of data associated with the subset of logical addresses, wherein the recommended error protection configuration is based at least in part on the quantity of times; and
receive, based at least in part on sending the indication of the recommended error protection configuration, an indication of a second error protection configuration for the subset.

22. A method at a host system, comprising:
receiving an indication of a set of logical addresses supported by a memory system and available for use by the host system;
assigning different types of data to subsets of logical addresses of the set of logical addresses, the subsets of logical addresses comprising a subset of logical addresses assigned a type of data from the different types of data;
selecting, for each subset of logical addresses, a respective error protection configuration for the subset of logical addresses, from a plurality of error protection configurations supported by the memory system, based at least in part on the type of data associated with the subset of logical addresses; and
sending to the memory system an indication of the subset of logical addresses and an indication of an error protection configuration for the subset of logical addresses.

23. The method of claim 22, further comprising:
receiving an indication of a plurality of error protection configurations supported by the memory system, wherein the error protection configuration for the subset of logical addresses is based at least in part on the plurality of error protection configurations supported by the memory system.

24. A method at a memory system, comprising:
sending, to a host system, an indication of a set of logical addresses available for use by the host system;
receiving, from the host system, an indication of a subset of logical addresses within the set of logical addresses and an indication of an error protection configuration for the memory system to use for the subset, wherein the error protection configuration for the subset is different than a second error protection configuration indicated for a second subset of logical addresses, within the set of logical addresses, that is assigned a different type of data than the subset of logical addresses;
receiving, from the host system, data associated with the subset of logical addresses; and
generating parity information for the data based at least in part on the error protection configuration for the subset of logical addresses associated with the data.

25. The method of claim 24, further comprising:
storing the parity information for the data in a portion of a memory associated with a group of logical addresses reserved for parity information.

* * * * *